US009276252B2

(12) United States Patent
Moon et al.

(10) Patent No.: US 9,276,252 B2
(45) Date of Patent: Mar. 1, 2016

(54) RECHARGEABLE BATTERY (71) Applicant: Samsung SDI Co., Ltd., Yongin-si, Gyeonggi-do (KR)

(72) Inventors: Jong-Seok Moon, Yongin-si (KR); Joong-Heon Kim, Yongin-si (KR); Hui-Jun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 280 days.

(21) Appl. No.: 13/951,454

(22) Filed: Jul. 25, 2013

(65) Prior Publication Data
US 2014/0255737 A1 Sep. 11, 2014

(30) Foreign Application Priority Data

Mar. 8, 2013 (KR) .................. 10-2013-0025115

(51) Int. Cl.
*H01M 2/34* (2006.01)
*H01M 2/26* (2006.01)
*H01M 10/42* (2006.01)

(52) U.S. Cl.
CPC ............. *H01M 2/348* (2013.01); *H01M 2/26* (2013.01); *H01M 2/34* (2013.01); *H01M 10/425* (2013.01); *H01M 2200/103* (2013.01)

(58) Field of Classification Search
CPC ......... H01M 2/26; H01M 2/34; H01M 2/348; H01M 10/425; H01M 2200/103
See application file for complete search history.

(56) References Cited

U.S. PATENT DOCUMENTS

| 8,586,236 B2 * | 11/2013 | Kwak | ............................. 429/163 |
| 2011/0135999 A1 * | 6/2011 | Kwak | ................. H01M 2/0207 429/163 |
| 2011/0136002 A1 * | 6/2011 | Cho | ...................... H01M 2/263 429/178 |
| 2011/0136004 A1 * | 6/2011 | Kwak | ................... H01M 2/024 429/186 |
| 2011/0177387 A1 | 7/2011 | Byun et al. | |
| 2011/0183165 A1 | 7/2011 | Byun et al. | |
| 2011/0244281 A1 | 10/2011 | Byun | |
| 2012/0021274 A1 | 1/2012 | Kim et al. | |
| 2013/0017420 A1 | 1/2013 | Byun et al. | |

FOREIGN PATENT DOCUMENTS

EP 2348558 A1 7/2011
EP 2372808 A1 10/2011

(Continued)

OTHER PUBLICATIONS

Extended European Search Report dated May 20, 2014, for European Application No. 13186210.4, 10 pgs.

*Primary Examiner* — Brittany Raymond
(74) *Attorney, Agent, or Firm* — Christie, Parker & Hale, LLP (57) ABSTRACT A rechargeable battery includes an electrode assembly including a negative electrode, a positive electrode, and a separator therebetween, a case housing the electrode assembly, a cap plate sealing the case and electrically connected to the positive electrode, a negative terminal and a positive terminal penetrating the cap plate and respectively electrically connected to the negative electrode and the positive electrode, and a safety member located between the electrode assembly and the case, electrically connected to the negative electrode, and including an end portion coupled to the negative electrode, a plate portion at a side of the electrode assembly, and a resistance controller coupling the end portion and the plate portion, and having a higher electrical resistance than the plate portion.

14 Claims, 9 Drawing Sheets

(56) References Cited

FOREIGN PATENT DOCUMENTS

| | | | |
|---|---|---|---|
| EP | 2395576 | A1 | 12/2011 |
| EP | 2506334 | A1 | 10/2012 |
| EP | 2509149 | A1 | 10/2012 |
| EP | 2515363 | A1 | 10/2012 |
| EP | 2521207 | A2 | 11/2012 |
| EP | 2541649 | A1 | 1/2013 |
| EP | 2544265 | A1 | 1/2013 |
| KR | 10-2008-0019311 | | 3/2008 |
| KR | 10-2012-0010669 | | 2/2012 |

\* cited by examiner

RECHARGEABLE BATTERY

CROSS-REFERENCE TO RELATED APPLICATION

This application claims priority to and the benefit of Korean Patent Application No. 10-2013-0025115 filed in the Korean Intellectual Property Office on Mar. 8, 2013, the entire contents of which are incorporated herein by reference.

BACKGROUND

1. Field

The described technology relates generally to a rechargeable battery.

2. Description of the Related Art

Unlike a primary battery, a rechargeable battery iteratively performs charging and discharging. A rechargeable battery having low capacity is used in a portable small electronic device such as a mobile phone, a laptop computer, and a camcorder, while a battery having large capacity is widely used as a power source for driving the motor in a hybrid vehicle, and the like.

The rechargeable battery includes an electrode assembly having a positive electrode and a negative electrode provided on respective sides of a separator, a casing to house the electrode assembly, a cap plate to close and seal the opening of the casing, and electrode terminals electrically connected to the electrode assembly and configured to penetrate the cap plate.

When a conductor (e.g., a conductive element) penetrates the case of the rechargeable battery, and thus contacts or pokes the electrode assembly, the negative electrode and the positive electrode may be short-circuited in the electrode assembly, thereby causing ignition or explosion of the electrode assembly.

To avoid or prevent ignition or explosion of the electrode assembly, the case may be connected to the positive electrode, and a safety member, which is connected to the negative electrode, is provided between the case and the electrode assembly. When the conductor penetrates the case and thus contacts the safety member, a high-voltage current output to the electrode assembly is discharged while flowing to the electrode assembly through the cap plate, the case, and the conductor. However, because the safety member has a constant thickness, the safety member has low electrical resistance (e.g., current resistance). Therefore, when the conductor penetrating the case contacts the safety member, an over-current flows in a contact area where the safety member and the case contact each other.

Accordingly, due to the over-current, the safety member may melt at the contact area. When the safety member melts, the current charged in the electrode assembly is no longer discharged. However, when the conductor moves further into the electrode assembly in this condition, the electrode assembly may still ignite or explode due to a short circuit between the negative electrode and the positive electrode in the electrode assembly.

The above information disclosed in this Background section is only for enhancement of understanding of the background of the described technology, and therefore it may contain information that does not form the prior art that is already known in this country to a person of ordinary skill in the art.

SUMMARY

One aspect of embodiments of the present invention provides a rechargeable battery that can safely discharge a current charged in an electrode assembly thereof by controlling the amount of current between a safety member and the electrode assembly to prevent the safety member from melting.

A rechargeable battery according to an exemplary embodiment of the present invention includes an electrode assembly including a negative electrode, a positive electrode, and a separator therebetween, a case housing the electrode assembly, a cap plate sealing the case and electrically connected to the positive electrode, a negative terminal and a positive terminal penetrating the cap plate and respectively electrically connected to the negative electrode and the positive electrode, and a safety member located between the electrode assembly and the case, electrically connected to the negative electrode, and including an end portion coupled to the negative electrode, a plate portion at a side of the electrode assembly, and a resistance controller coupling the end portion and the plate portion, and having a higher electrical resistance than the plate portion.

The end portion may be coupled to an uncoated region of the negative electrode, and the resistance controller may be bent away from the uncoated region to define a space between the resistance controller and the uncoated region.

The resistance controller may extend in a direction between the end portion and the plate portion to the cap plate.

The resistance controller may define a plurality of through-holes separated at intervals along the direction, and may include a fuse portion between neighboring through-holes to couple the end portion and the plate portion.

The fuse portion may include a plurality of fuses and may have a thickness that is the same as that of the plate portion.

The fuses may each have a width equal to a distance between respective ones of the neighboring through-holes, and the widths of two or more fuses may be different.

The fuse portion may include a plurality of fuses, and a thickness of one of the fuses may be less than that of the plate portion.

The fuse portion may include a plurality of fuses each having a width equal to a distance between respective ones of the neighboring through-holes, each of the widths of the fuses being equal.

The fuses may each have a thickness at a region between respective ones of the neighboring through-holes, the thicknesses of the fuses being different from one another.

The safety member may be at both sides of the electrode assembly.

The rechargeable battery may further include a first insulation member between the safety member and the electrode assembly, and a second insulation member between the safety member and the case.

A rechargeable battery according to another exemplary embodiment of the present invention includes an electrode assembly including a negative electrode, a positive electrode, and a separator therebetween, a case housing the electrode assembly, and electrically connected to the positive electrode, and a safety member located between the electrode assembly and the case, electrically connected to the negative electrode, and including an end portion coupled to the negative electrode, a plate portion at one side of the electrode assembly, and a resistance controller coupling the end portion and the plate portion, and having an electrical resistance that is higher than that of the plate portion.

The resistance controller may define a plurality of through-holes, and may include a fuse portion between neighboring through-holes and coupling the end portion and the plate portion.

The fuse portion may include a plurality of fuses, at least one of which having a portion that is thinner than the plate portion.

As described above, according to the exemplary embodiments of the present invention, the resistance controller is provided between the end portion and the plate portion in the safety member. Thus, when a conductor penetrates the electrode assembly, thereby contacting the safety member (plate portion), the resistance controller maintains high electrical resistance so that a current flow between the electrode assembly, the safety member, and the conductor can be controlled, and so that an occurrence of over-current at a location where the conductor and the safety member contact each other can be avoided, thereby keeping the safety member from melting.

In addition, when an over-current flows at the location where the conductor and the safety member contact each other, the fuse portion in the resistance controller is partially disconnected to increase the resistance of the resistance controller, thereby controlling the current amount. Therefore, the current charged in the electrode assembly can be safely discharged through the resistance controller that has its electrical resistance increased.

DETAILED DESCRIPTION

Embodiments of the present invention will be described more fully hereinafter with reference to the accompanying drawings, in which exemplary embodiments of the invention are shown. As those skilled in the art would realize, the described embodiments may be modified in different ways, all without departing from the spirit or scope of the present invention. The drawings and description are to be regarded as illustrative in nature and not restrictive. Like reference numerals designate like elements throughout the specification.

Figure 1:
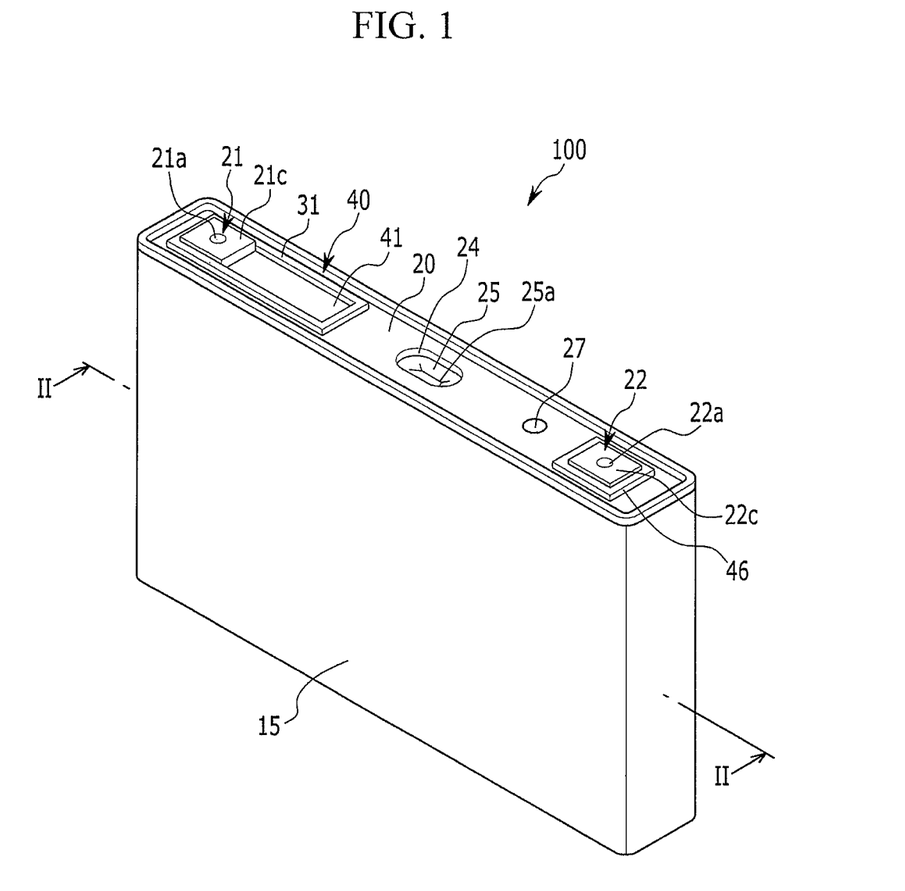
FIG. 1 is a perspective view of a rechargeable battery according to a first exemplary embodiment of the present invention.
Figure 2:
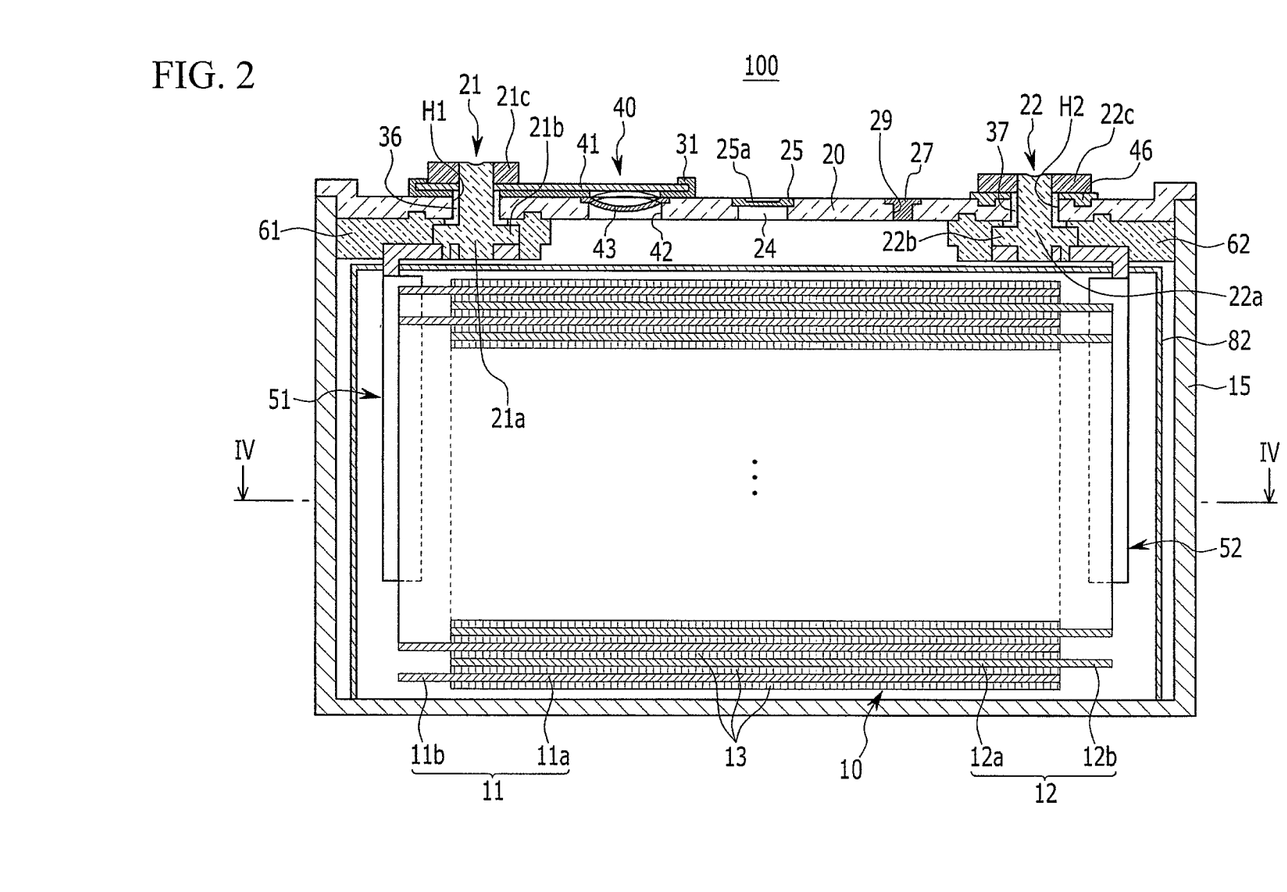
FIG. 2 is a cross-sectional view of the rechargeable battery of FIG. 1, taken along the line II-II.

FIG. 1 is a perspective view of a rechargeable battery according to a first exemplary embodiment of the present invention, and FIG. 2 is a cross-sectional view of the rechargeable battery of FIG. 1 taken along the line II-II. Referring to FIGS. 1 and 2, a rechargeable battery 100 according to a first exemplary embodiment includes an electrode assembly 10 for charging and discharging, a case 15 for installing the electrode assembly 10 therein, a cap plate 20 coupled to the case 15 to cover an opening of the case 15, a first electrode terminal (hereinafter referred to as a negative terminal) 21, a second electrode terminal (hereinafter referred to as a positive terminal) 22, and an external short circuit portion 40 at the side of the negative terminal 21. The negative terminal 21 and the positive terminal 22 are at the cap plate 20.

For example, the electrode assembly 10 is formed by placing a first electrode (hereinafter referred to as a negative electrode) 11 and a second electrode (hereinafter referred to as a positive electrode) 12 at respective surfaces of a separator 13, which is an insulator, and spiral-winding the negative electrode 11, the separator 13, and the positive electrode 12 in a jelly roll shape.

The negative electrode 11 and the positive electrode 12 respectively include coated portions 11a and 12a, in which an active material is applied to a current collector of a metal plate, and uncoated portions 11b and 12b, which are formed as exposed current collectors because no active material is applied thereto.

The uncoated portion 11b of the negative electrode 11 is at one end of the negative electrode 11 along the wound negative electrode 11. The uncoated portion 12b of the positive electrode 12 is at one end of the positive electrode 12 along the wound positive electrode 12. Further, the uncoated portions 11b and 12b are located at opposite ends of the electrode assembly 10.

For example, the case 15 is approximately cuboidal to set a space for receiving the electrode assembly 10, and an opening of the case 15 is at one side of the cuboid to allow the electrode assembly 10 to connect external and internal spaces of the cuboid. The opening may enable the electrode assembly 10 to be inserted into the case 15.

The cap plate 20 is placed in the opening of the case 15 to seal the case 15. For example, the case 15 and the cap plate 20 may be formed of aluminum and may be welded to each other.

In addition, the cap plate 20 has an electrolyte injection opening 29, a vent hole 24, and terminal holes H1 and H2. The electrolyte injection opening 29 allows injection of the electrolyte solution into the case 15 after the cap plate 20 is coupled to the case 15. After the injection of the electrolyte solution, the electrolyte injection opening 29 is sealed by a sealing cap 27.

The vent hole 24 is sealed by a vent plate 25, which is configured to discharge internal pressure of the rechargeable battery 100, which may be caused by internal gas. When the internal pressure of the rechargeable battery 100 reaches a predetermined level, the vent plate 25 ruptures (e.g., as a result of a notch 25a therein) to open the vent hole 24.

The negative terminal 21 and the positive terminal 22 are respectively provided in the terminal holes H1 and H2 of the cap plate 20, and are each electrically connected to the electrode assembly 10. That is, the negative terminal 21 is electrically connected to the negative electrode 11 of the electrode assembly 10, while the positive terminal 22 is electrically connected to the positive electrode 12 of the electrode assembly 10. Thus, the electrode assembly 10 is effectively drawn out to the outside of the case 15 through the negative terminal 21 and the positive terminal 22.

Because the negative terminal 21 and the positive terminal 22 have the same structure as each other at the inside of the cap plate 20, the same structure will be described together, and because the negative terminal 21 and the positive terminal 22 have different structures from each other at the outside of the cap plate 20, the different structures will be separately described.

The negative and positive terminals 21 and 22 include rivet terminals 21a and 22a respectively installed at the terminal holes H1 and H2 of the cap plate 20, flanges 21b and 22b that are widely formed to be respectively integrated with the rivet terminals 21a and 22a at the inside of the cap plate 20, and plate terminals 21c and 22c at the outside of the cap plate 20 to be respectively connected to the rivet terminals 21a and 22a by riveting or welding.

Negative and positive gaskets 36 and 37 are respectively installed between the rivet terminals 21a and 22a and the inner surfaces of the terminal holes H1 and H2 of the cap plate 20 to thereby seal holes H1 and H2, and to thereby establish electrical connection between the rivet terminals 21a and 22a and the cap plate 20.

Furthermore, the negative and positive gaskets 36 and 37 respectively extend between the flanges 21b and 22b and the inner surface of the cap plate 20 to further seal holes H1 and H2, and to establish electrical connection between the flanges 21b and 22b and the cap plate 20. That is, the negative and positive gaskets 36 and 37 respectively install the negative and positive terminals 21 and 22 at the cap plate 20, thereby preventing the electrolyte solution from leaking through the terminal holes H1 and H2.

A negative electrode lead tab 51 and a positive electrode lead tab 52 electrically connect the negative terminal 21 and the positive terminal 22 to the negative electrode 11 and the positive electrode 12 of the electrode assembly 10, respectively. That is, the negative electrode lead tab 51 and the positive electrode lead tab 52 are respectively coupled to lower ends of the rivet terminals 21a and 22a, and the lower ends are caulked such that the negative electrode lead tab 51 and the positive electrode lead tab 52 are respectively coupled to the lower ends of the rivet terminals 21a and 22a while being respectively supported by the flanges 21b and 22b.

A negative electrode insulation member 61 and a positive electrode insulation member 62 are provided for electrical insulation between the cap plate 20 and respective ones of the negative electrode lead tab 51 and the positive electrode lead tab 52. In addition, the negative electrode insulation member 61 and the positive electrode insulation member 62 are coupled to the cap plate 20, and respectively surround the negative and positive electrode lead tabs 51 and 52, the rivet terminals 21a and 22a, and the flanges 21b and 22b, thereby stabilizing a connection structure thereof.

Now, the external short circuit portion 40 will be described in association with the plate terminal 21c of the negative terminal 21, and a top plate 46 will be described in association with the plate terminal 22c of the positive terminal 22.

The external short circuit portion 40 at the side of the negative terminal 21 includes a short circuit tab 41 and a short circuit member 43 that are separated/electrically insulated or electrically connected/short-circuited depending on an amount of internal pressure. The short circuit tab 41 is electrically connected to the rivet terminal 21a of the negative terminal 21, and is coupled to the external side of the cap plate 20 using an insulation member 31.

The insulation member 31 is provided between the short circuit tab 41 and the cap plate 20 to electrically insulate the short circuit tab 41 form the cap plate 20. That is, to electrically insulate the cap plate 20 from the negative terminal 21.

The short circuit tab 41 and the plate terminal 21c are coupled (e.g., by caulking) to the upper end of the rivet terminal 21a. Therefore, the short circuit tab 41 and the plate terminal 21a are fixed to the cap plate 20 while interposing the insulation member 31 therebetween.

The short circuit member 43 is provided in a short circuit hole 42 that is formed in the cap plate 20. The short circuit tab 41 is connected to the negative terminal 21 and extends along the external side of the short circuit member 43. Thus, the short circuit tab 41 and the short circuit member 43 correspond to the short circuit hole 42, and face each other while maintaining a separated/insulated state (i.e., a state shown in FIG. 2 wherein the short circuit member 43 is arched away from the short circuit tab 41).

However, when the internal pressure of the rechargeable battery 100 is increased, the short circuit tab 41 and the short circuit member 43 form a short circuit state (i.e., a state shown in FIG. 2 wherein the short circuit member 43 arches toward, and contacts, the short circuit tab 41). The short circuit state is caused by inversion of the short circuit member 43, thereby allowing current charged in the electrode assembly 10 to be stably discharged to the outside of the electrode assembly 10.

The conductive top plate 46 is provided between the cap plate 20 and the plate terminal 22c at the side of the positive terminal 22, thereby electrically connecting the plate terminal 22c to the cap plate 20, such that the cap plate 20 remains electrically connected with the positive terminal 22.

The top plate 46 and the plate terminal 22c are coupled to the upper end of the rivet terminal 22a, and the upper end is riveted or welded such that the top plate 46 and the plate terminal 22c are fastened to the upper end of the rivet terminal 22a. The plate terminal 22c is at the external side of the cap plate 20 with the top plate 46 therebetween.

The positive electrode gasket 37 also extends between the rivet terminal 22a and the top plate 46 to prevent the rivet terminal 22a from directly contacting the top plate 46 to avoid direct electrical connection. That is, the rivet terminal 22a is electrically connected to the top plate 46 through the plate terminal 22c. Therefore, the top plate 46, the cap plate 20, and the case 15 can have positive polarity.

Figure 3:
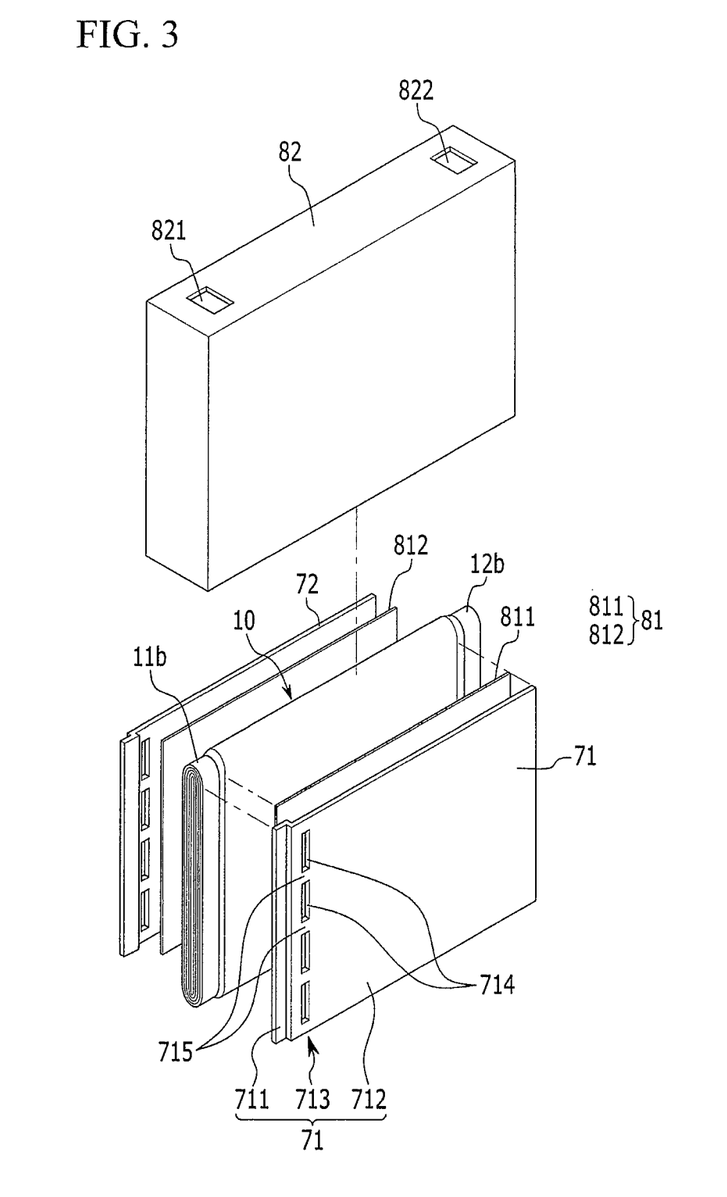
FIG. 3 is an exploded perspective view of an electrode assembly, a first insulation member, a safety member, and a second insulation member of the rechargeable battery of the embodiment shown in FIG. 1.
Figure 4:
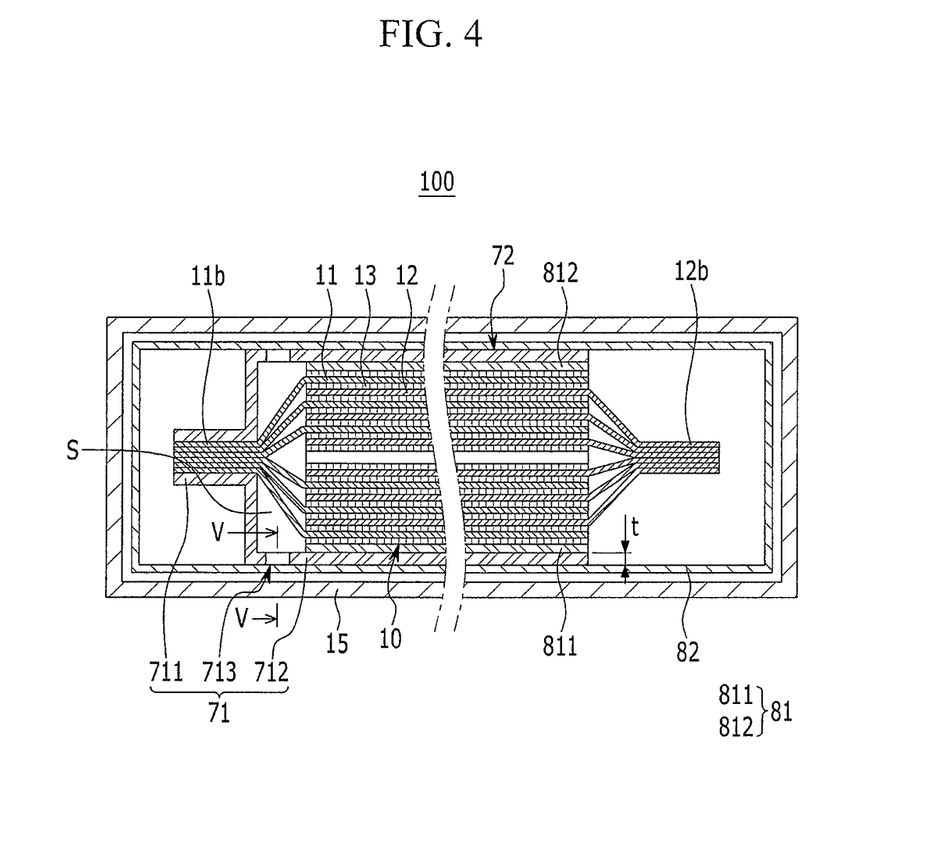
FIG. 4 is a cross-sectional view of the rechargeable battery of FIG. 2, taken along the line IV-IV.

FIG. 3 is an exploded perspective view of an electrode assembly, a first insulation member, a safety member, and a second insulation member of the rechargeable battery of FIG. 2, and FIG. 4 is a cross-sectional view of the rechargeable battery of FIG. 2, taken along the line IV-IV. Referring to FIGS. 3 and 4, the rechargeable battery 100 according to the first exemplary embodiment includes safety members 71 and 72 having an insulated structure that are located between the electrode assembly 10 and the case 15.

The safety members 71 and 72 in the present exemplary embodiment may be at respective sides of the electrode assembly, and may contact a conductor (e.g., a conductive element) that penetrates both sides of the electrode assembly 10. However, in other embodiments of the present invention, the safety member may be at only one side of the electrode assembly, and may contact a conductor that penetrates the one side of the electrode assembly 10. For insulation of the safety members 71 and 72, a first insulation member 81 and a second insulation member 82 are located at both sides of the safety members 71 and 72.

The first insulation member 81 forms an insulation structure by being between the electrode assembly 10 and the safety members 71 and 72. That is, the first insulation member 81 includes an insulation member 811 between the safety member 71 and one side of the electrode assembly 10, and also includes an insulation member 812 forming an insulation structure by being between the safety member 72 and the other side of the electrode assembly 10.

The second insulation member 82 forms an insulation structure by being provided between the safety members 71 and 72 and the case 15.

An upper portion of the second insulation member 82 is closed to further insulate the upper portions of the safety members 71 and 72 from the cap plate 20. Therefore, the second insulation member 82 includes draw-out holes 821 and 822 at an upper portion thereof to respectively draw out the negative electrode lead tab 51 and the positive electrode lead tab 52.

The safety members 71 and 72 are provided between the electrode assembly 10 and the case 15, and are intended to cause a short circuit to occur at the outer side of the electrode assembly 10 before occurring in the electrode assembly 10 due to penetration of the conductor. For this purpose, the safety members 71 and 72 are electrically connected to the negative electrode 11 of the electrode assembly 10, and thus have negative polarity.

For convenience, the safety member 71 on one side will be described. The safety member 71 includes an end portion 711 coupled to the negative electrode 11, a plate portion 712 at one side of the electrode assembly 10, and a resistance controller 713 between the end portion 711 and the plate portion 712, thereby coupling the end portion 711 and the plate portion 712. The resistance controller 713 has higher electrical resistance than that of the plate portion 712.

The end portion 711 may be coupled to the uncoated region 11b of the negative electrode 11 by, for example, resistance welding or laser welding. The resistance controller 713 is bent away from the uncoated region 11b to form a space S (shown in FIG. 4) between the safety member 71 and the opposite side of the uncoated region 11b. That is, the resistance controller 713 is perpendicular to the cap plate 20 and is between the end portion 711 and the plate portion 712 (refer to FIG. 3).

Figure 5:
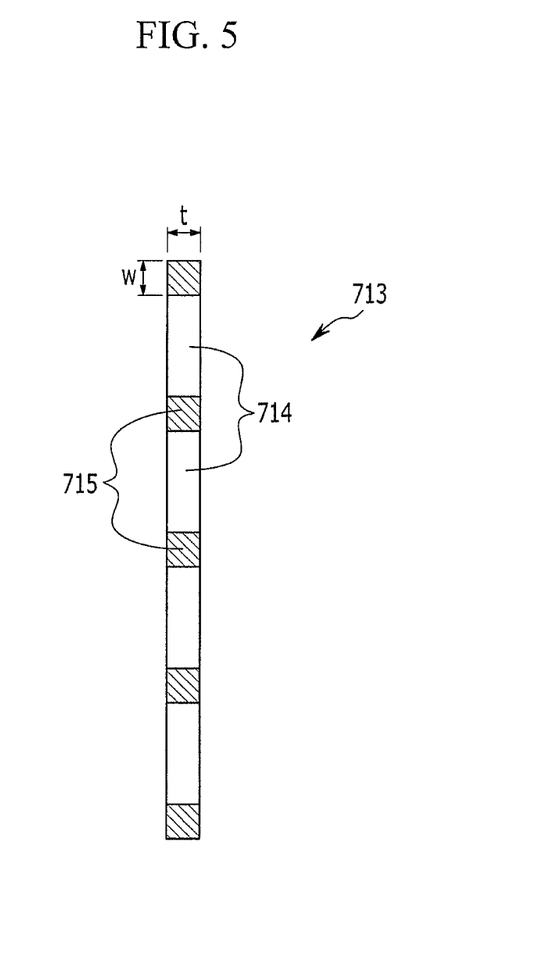
FIG. 5 is a cross-sectional view of a portion of the rechargeable battery of FIG. 4, taken along the line V-V.

FIG. 5 is a cross-sectional view of a portion of the rechargeable battery of FIG. 4, taken along the line V-V. Referring to FIGS. 3 to 5, the resistance controller 713 includes a plurality of through-holes 714, which are separated from each other at intervals along a vertical direction, and a plurality of fuse portions 715 between neighboring through-holes 714 for coupling the end portion 711 to the plate portion 712. That is, the fuse portions 715 have a width W, which is also a distance between neighboring through-holes 714.

For example, there may be a plurality of fuse portions 715, each of which may have a thickness t that is equal to a thickness t of the plate portion 712. That is, the resistance controller 713 may include the same material as, and may have the same thickness of, the end portion 711 and the plate portion 712. Therefore, the fuse portions 715 may have higher electrical resistance than the end portion 711 and the plate portion 712 because the through-holes 714 block a current path.

Accordingly, when the conductor penetrates the rechargeable battery 100 of the first exemplary embodiment to contact the plate portion 712 of the safety member 71, a current flow, which is between the uncoated region 11b of the negative electrode 11, the end portion 711, the fuse portion 715, the plate portion 712, and the conductor, is controlled due to the fuse portion 715 having higher electrical resistance than that of the plate portion 712. That is, the current flow is controlled between the electrode assembly 10, the safety member 71, and the conductor to discharge the current of the electrode assembly 10.

In addition, when an over-current flows between the electrode assembly 10, the safety member 71, and the conductor, then the plurality of fuse portions 715 are partially disconnected so that the current flow is further limited. Therefore, overcurrent at a location where the conductor and the safety member 71 contact each other can be reduced or prevented so that the safety member 71 does not melt, thereby maximizing current discharging of the electrode assembly 10.

In the first exemplary embodiment of the present invention, the through-holes 714 are in the shape of a rectangle having long sides and short sides. However, the through-hole may have various shapes, such as a circle, a square, a triangle, etc.

Hereinafter, various exemplary embodiments of the present invention will be described, and duplicated description of configurations that are the same as those of the above-described embodiments will be omitted.

Figure 6:
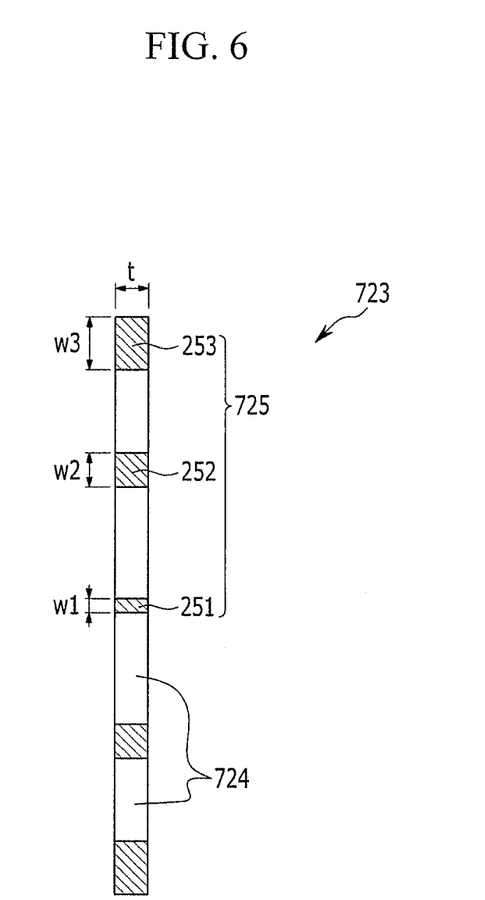
FIG. 6 is a cross-sectional view of a rechargeable battery according to a second exemplary embodiment of the present invention.

FIG. 6 is a cross-sectional view of a safety member used in a rechargeable battery according to a second exemplary embodiment of the present invention. Referring to FIG. 6, a resistance controller 723 includes a plurality of fuse portions 725, some of which having different widths, that are respectively set between neighboring through-holes 724.

For example, the fuse portions 725 include a first fuse portion (e.g., a first fuse) 251 having a first width W1 in the center thereof, second fuse portions (e.g., second fuses) 252 each having a second width W2 at both sides of the first fuse portion 251, and third fuse portions (e.g., third fuses) 253 each having a third width W3 at one side of each of the second fuse portions 252. Because the second width W2 is larger than the first width W1, and because the third width W3 is larger than the second width W2, the first fuse portion 251, the second fuse portion 252, and the third fuse portion 253 may have sequentially decreased electrical resistance.

Thus, when a conductor penetrates the rechargeable battery of the second exemplary embodiment, thus contacting the plate portion 712 of the safety member 71, current flow is controlled between the uncoated region 11b of a negative electrode 11, the end portion 711, the fuse portion 725, the plate portion 712, and the conductor due to the fuse portion 725 having higher electrical resistance of than that of the plate portion 712. That is, the current flow is controlled between the electrode assembly 10, the safety member 71, and the conductor so that the current of the electrode assembly 10 is discharged.

In addition, when an over-current flows to the electrode assembly 10, then the first fuse portion 251, the second fuse portion 252, and the third fuse portion 253 are sequentially disconnected so that the current flow is further limited. Therefore, over-current is prevented at a location where the conductor and the safety member 71 contact each other to avoid melting the safety member 71, thereby maximizing current discharging of the electrode assembly 10.

Figure 7:
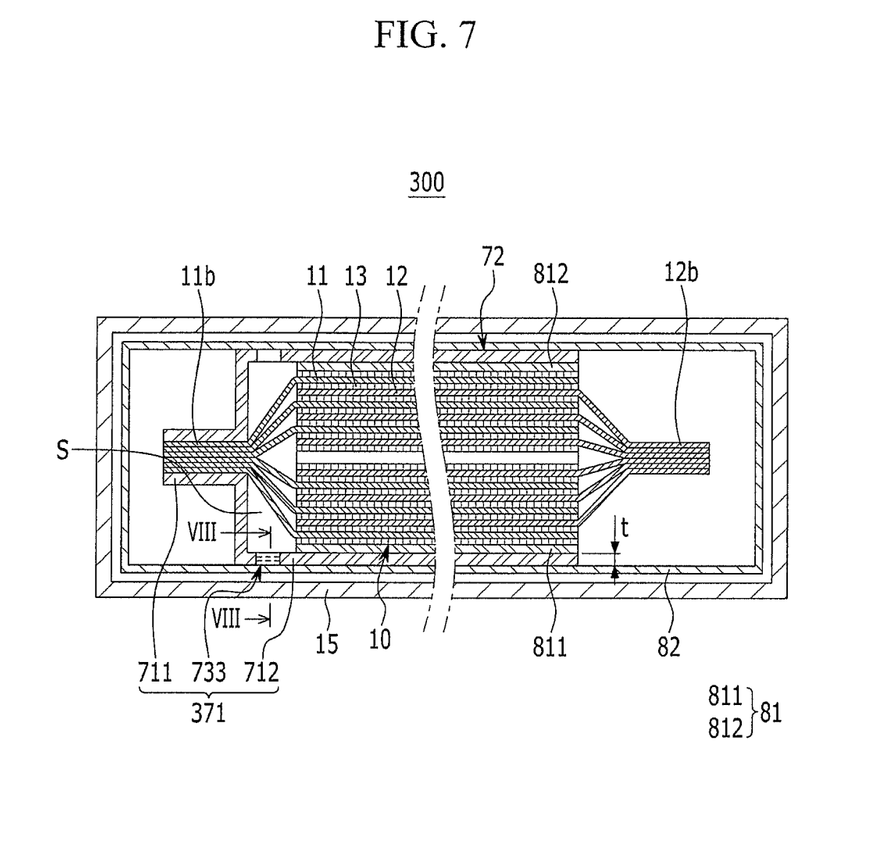
FIG. 7 is a cross-sectional view of a rechargeable battery according to a third exemplary embodiment of the present invention.
Figure 8:
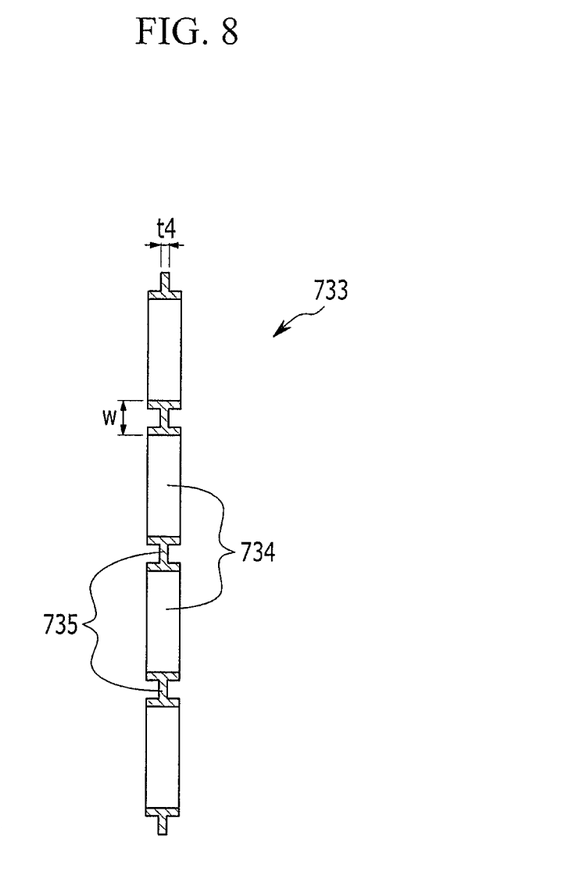
FIG. 8 is a cross-sectional view of a portion of the rechargeable battery shown in FIG. 7, taken along the line VIII-VIII.

FIG. 7 is a cross-sectional view of a rechargeable battery 300 according to a third exemplary embodiment of the present invention, and FIG. 8 is a cross-sectional view of the rechargeable battery of FIG. 7 taken along the line VIII-VIII. Referring to FIGS. 7 and 8, a resistance controller 733 includes a plurality of fuse portions 735 respectively set between neighboring through-holes 734. The fuse portions 735 include a portion having a thickness t4 that is thinner than the thickness t of the plate portion 712.

The resistance controller 733 is formed of the same material as, and has the same width as, the end portion 711 and the plate portion 712. A thickness t4 of the resistance controller 733 is thinner than the thickness t4 of the plate portion 712. Thus, because the current path is blocked, or diverted, by the through-holes 734, and may also be further blocked in the fuse portion 735, the fuse portion 735 has higher electrical resistance than the end portion 711 and the plate portion 712.

Therefore, when a conductor penetrates the rechargeable battery 300 to contact the plate portion 712 of a safety member 371, a current flow is controlled between the uncoated region 11b of the negative electrode 11, the end portion 711, the fuse portion 735, the plate portion 712, and the conductor due to the electrical resistance of the safety member 735 being higher than the electrical resistance of the plate portion 712. That is, the current flow is controlled between the electrode assembly 10, the safety member 371, and the conductor so that the current of the electrode assembly 10 is discharged.

In addition, when an over-current flows between the electrode assembly 10, the safety member 371, and the conductor, the fuse portions 735 may be partially disconnected so that the flow of the current is further limited. Thus, by avoiding the over-current at a location where the conductor and the safety member 371 contact each other, the safety member 371 is not melted so that the current of the electrode assembly 10 can be discharged to the maximum.

Figure 9:
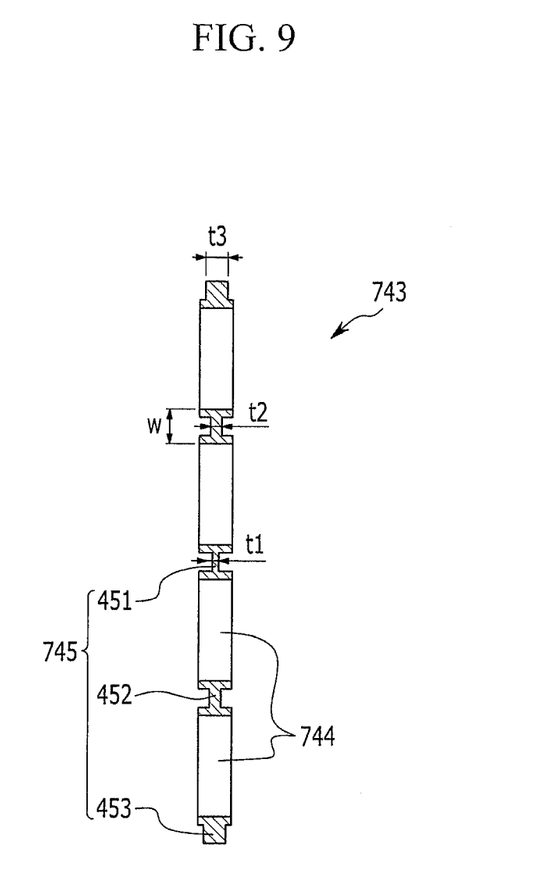
FIG. 9 is a cross-sectional view of a safety member used in a rechargeable battery according to a fourth exemplary embodiment of the present invention.

FIG. 9 is a cross-sectional view of a safety member used in a rechargeable battery according to a fourth exemplary embodiment of the present invention. Referring to FIGS. 7 and 9, a resistance controller 743 includes a plurality of fuse portions 745 having different thicknesses and respectively set between neighboring through-holes 744.

For example, the fuse portions 745 include a first fuse portion 451 having a first thickness t1 at a center of the resistance controller 743, second fuse portions 452 each having a second thickness t2 located at both sides of the first fuse portion 451, and third fuse portions 453 each having a third thickness t3 at one side of each of the second fuse portions 452. Because the second thickness t2 is greater than the first thickness t1, and because the third thickness t3 is greater than the second thickness t2, the electrical resistances of the first, second, and third fuse portions 451, 452, and 453 sequentially decrease.

Thus, when a conductor penetrates the rechargeable battery of the fourth exemplary embodiment to contact a plate portion 712 of a safety member 371, a current flow (e.g., between an uncoated region 11b of a negative electrode 11, an end portion 711, a fuse portion 745, a plate portion 712, and the conductor) is controlled due to the fuse portion 745 having higher electrical resistance than the plate portion 712. That is, the current flow between the electrode assembly 10, the safety member 371, and the conductor is controlled so that the current of the electrode assembly 10 is discharged.

In addition, when an over-current flows between the electrode assembly 10, the safety member 371, and the conductor, the first fuse portion 451, the second fuse portion 452, and the third fuse portion 453 may be sequentially disconnected in the fuse portion 745 to further limit the current flow. Thus, over-current at a location where the conductor and the safety member 371 contact each other is reduced or prevented, thereby preventing the safety member 371 from melting, so that the current of the electrode assembly 10 can be discharged to the maximum.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF SOME OF THE REFERENCE CHARACTERS

| | |
|---|---|
| 10: electrode assembly | 11: first electrode (negative electrode) |
| 11a, 12a: coated region | 11b, 12b: uncoated region |
| 15: case | 20: cap plate |
| 21: first electrode terminal (negative terminal) | |
| 21a, 22a: rivet terminal | 21c, 22c: plate terminal |
| 21b, 22b: flange | 24: vent hole |
| 22: second electrode terminal (positive terminal) | |
| 25: vent plate | 27: sealing cap |
| 29: electrolyte injection opening | 31: insulation member |
| 36, 37: negative, positive electrode gasket | |
| 40: external short circuit portion | 42: short circuit hole |
| 41: short circuit tab | 46: top plate |
| 43: short circuit member | 81, 82: first and second insulation member |
| 51, 52: negative, positive electrode lead tab | |
| 61, 62: negative, positive electrode insulation member | |
| 71, 72, 371: safety member | 251, 451: first fuse portion |
| 100, 300: rechargeable battery | 253, 453: third fuse portion |
| 252, 452: second fuse portion | 712: plate portion |
| 711: end portion | H1, H2: terminal hole |
| 713, 723, 733, 743: resistance controller | |
| 714, 724, 734, 744: through-hole | |
| 715, 725, 735, 745: fuse portion | |
| 811, 812: eleventh, twelfth insulation member | |
| 821, 822: draw-out hole | t, t4: thickness |
| S: space | W: width |
| t1, t2, t3: first, second, and third thickness | |
| W1, W2, W3: first, second, and third width | |

What is claimed is:

1. A rechargeable battery comprising:
    an electrode assembly comprising a negative electrode, a positive electrode, and a separator therebetween;
    a case housing the electrode assembly;
    a cap plate sealing the case and electrically connected to the positive electrode;
    a negative terminal and a positive terminal penetrating the cap plate and respectively electrically connected to the negative electrode and the positive electrode; and
    a safety member located between the electrode assembly and the case, electrically connected to the negative electrode, and comprising:
        an end portion coupled to the negative electrode,
        a plate portion at a side of the electrode assembly, and
        a resistance controller coupling the end portion and the plate portion, and having a higher electrical resistance than the plate portion.

2. The rechargeable battery of claim 1, wherein the end portion is coupled to an uncoated region of the negative electrode, and
    wherein the resistance controller is bent away from the uncoated region to define a space between the resistance controller and the uncoated region.

3. The rechargeable battery of claim 2, wherein the resistance controller extends in a direction between the end portion and the plate portion to the cap plate.

4. The rechargeable battery of claim 3, wherein the resistance controller defines a plurality of through-holes separated at intervals along the direction, and comprises a fuse portion between neighboring through-holes to couple the end portion and the plate portion.

5. The rechargeable battery of claim 4, wherein the fuse portion comprises a plurality of fuses and has a thickness that is the same as that of the plate portion.

6. The rechargeable battery of claim 5, wherein the fuses each has a width equal to a distance between respective ones of the neighboring through-holes, and wherein the widths of two or more fuses are different.

7. The rechargeable battery of claim 4, wherein the fuse portion comprises a plurality of fuses, and wherein a thickness of one of the fuses is less than that of the plate portion.

8. The rechargeable battery of claim 4, wherein the fuse portion comprises a plurality of fuses each having a width equal to a distance between respective ones of the neighboring through-holes, each of the widths of the fuses being equal.

9. The rechargeable battery of claim 8, wherein the fuses each have a thickness at a region between respective ones of the neighboring through-holes, the thicknesses of the fuses being different from one another.

10. The rechargeable battery of claim 1, wherein the safety member is at both sides of the electrode assembly.

11. The rechargeable battery of claim 1, further comprising:

a first insulation member between the safety member and the electrode assembly; and a second insulation member between the safety member and the case.

12. A rechargeable battery comprising:

an electrode assembly comprising a negative electrode, a positive electrode, and a separator therebetween;

a case housing the electrode assembly, and electrically connected to the positive electrode; and a safety member located between the electrode assembly and the case, electrically connected to the negative electrode, and comprising:

an end portion coupled to the negative electrode, a plate portion at one side of the electrode assembly, and a resistance controller coupling the end portion and the plate portion, and having an electrical resistance that is higher than that of the plate portion.

13. The rechargeable battery of claim 12, wherein the resistance controller defines a plurality of through-holes, and comprises a fuse portion between neighboring through-holes and coupling the end portion and the plate portion.

14. The rechargeable battery of claim 13, wherein the fuse portion comprises a plurality of fuses, at least one of which having a portion that is thinner than the plate portion.

* * * * *